Nov. 11, 1958 J. H. WIGHAM Re. 24,565

FALLEN PLANT PICK-UP ATTACHMENT FOR COMBINES

Original Filed Oct. 6, 1952 2 Sheets-Sheet 1

INVENTOR
JACK H. WIGHAM

BY Jacobi + Jacobi
ATTORNEYS

FALLEN PLANT PICK-UP ATTACHMENT FOR COMBINES
Original Filed Oct. 6, 1952 2 Sheets-Sheet 2
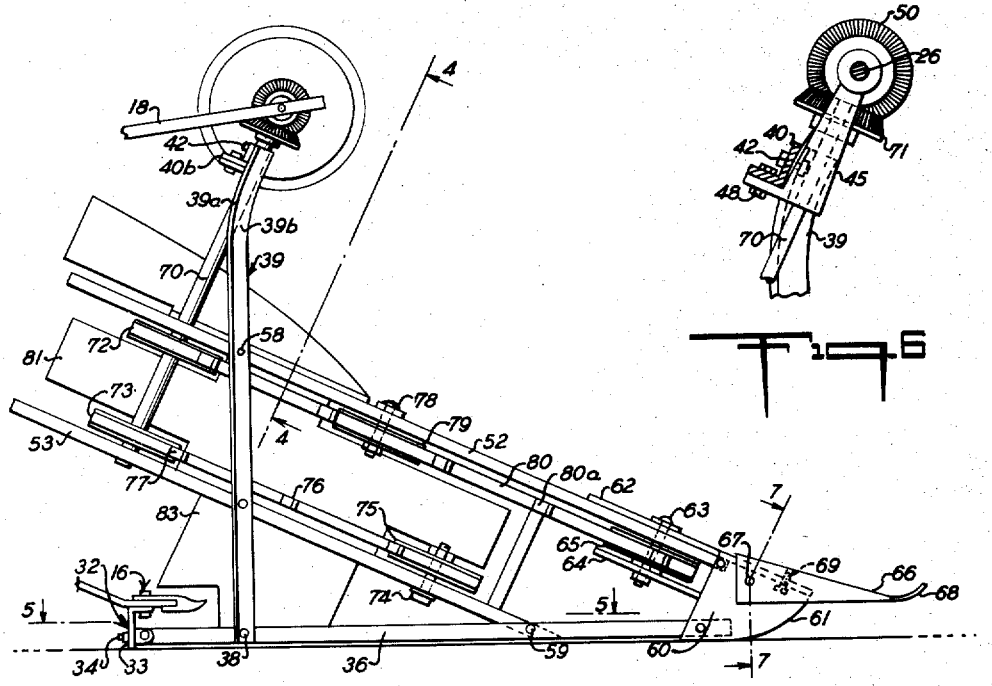
FIG. 6
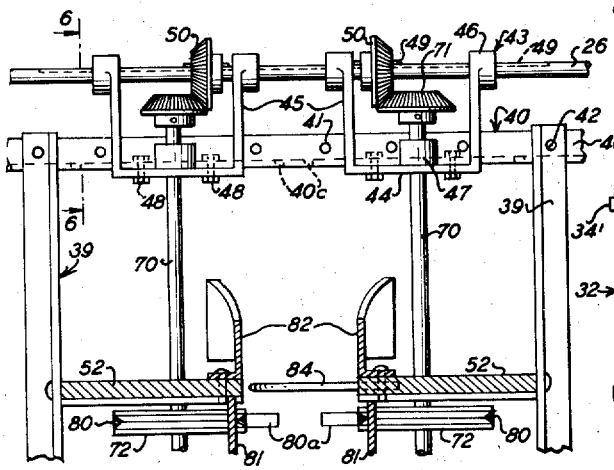
FIG. 3
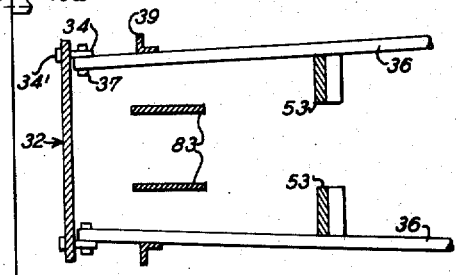
FIG. 4
FIG. 5
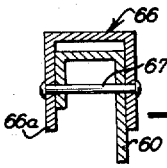
FIG. 7
INVENTOR
JACK H. WIGHAM
BY Jacobi & Jacobi
ATTORNEYS United States Patent Office Re. 24,565

Reissued Nov. 11, 1958

24,565

FALLEN PLANT PICK-UP ATTACHMENT FOR COMBINES

Jack H. Wigham, Panhandle, Tex.

Original No. 2,737,770, dated March 13, 1956, Serial No. 313,236, October 6, 1952. Application for reissue March 12, 1958, Serial No. 721,069

2 Claims. (Cl. 56—98)

Matter enclosed in heavy brackets [ ] appears in the original patent but forms no part of this reissue specification; matter printed in italics indicates the additions made by reissue.

This invention relates generally to the class of harvesting machines and is directed particularly to an attachment for a combine.

The present combine attachment is designed for picking up grain crops which have fallen over or been beaten down by wind or rain.

In connection with the production of grain crops such as wheat, grain sorghums and the like a great deal of loss occurs as a result of the plant falling over or being beaten to the ground so that when the harvesting machine of the conventional type passes over the field much of the fallen plants are passed over. Consequently a large percentage of the grain remains in the field and becomes a loss to the farmer.

A principal object of the present invention is to provide an attachment for a combine machine which is substituted for the regular rotating reel which cooperates with the cutter to move the cut plants onto the combine conveyor belt, by means of which substitute attachment grain plants which have fallen to the ground can be elevated or raised up and fed to the cutter and then passed into the combine structure in the conventional manner to be thrashed.

Another object of the invention is to provide a combine attachment of the above described character which is designed in a novel manner whereby individual plant stalks can be engaged and raised to an upright or near standing position so as to be cut off and caught on the combine conveyor apron.

Still another object of the invention is to provide an attachment of the character stated wherein one or more pairs of forwardly extending elongate units are carried over and extend forwardly from the cutter to pass along the crop row and receive between the members of each pair the fallen grain, the said members of each of the units being relatively adjustable so as to adapt them to operate efficiently along thin or sparsely planted rows as well as upon thickly planted rows.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 3 is a view in side elevation on an enlarged scale of the attachment with *certain parts omitted for greater clarity* [a portion only of the combine cutter bar].

Figure 4 is a sectional view taken substantially on the line 4—4 of Figure 3, on an enlarged scale.

Figure 5 is a horizontal section *on a reduced scale* taken substantially on the line 5—5 of Figure 3 through the two cooperating parts of a pick-up unit.

Figure 6 is a sectional view, on an enlarged scale, taken substantially on the line 6—6 of Figure 4.

Figure 7 is a section taken substantially on the line 7—7 of Figure 3.

Figure 1:
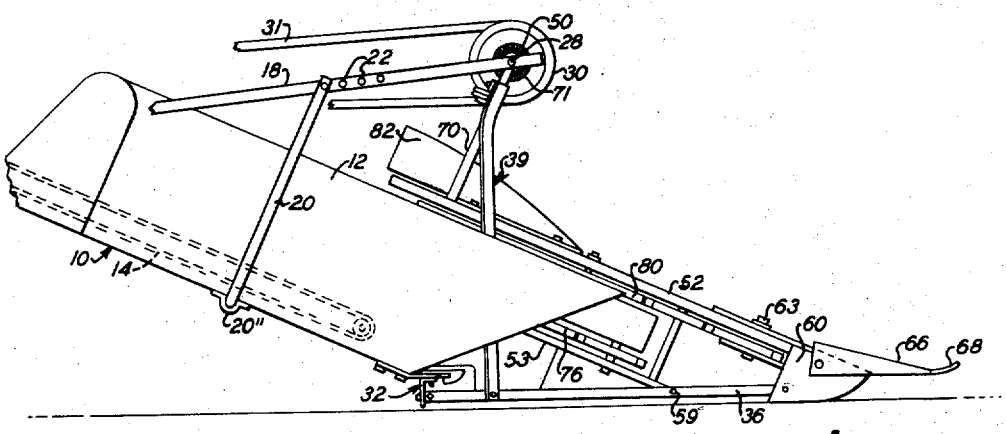
Figure 1 is a view in side elevation of the forward end portion of a combine cutter and elevator apron showing attached thereto the mechanism of the present invention in place of the conventional reel.

Referring now more particularly to the drawings the numeral 10 generally designates the grain receiving apron structure of a conventional combine which comprises the forwardly directed spaced parallel side walls 12 between which is located the conveyor 14 which carries the cut grain into the combine for treatment.

Extending across the front edge of the bottom portion of the structure 10 is the usual or conventional cutter bar which is generally designated 16 and supported on an angle bar 32, as best shown in Figure 3.

The numeral 18 designates two arms each of which is pivotally attached to a side wall 12 for vertical swinging movement. These arms support the conventional reel and reel shaft which for the application of the present invention are removed.

The numeral 20 designates pivoted braces or support struts which are attached to the structure 10 by inwardly angled lower end portions 20′, engaged in eyes 20″ on the structure bottom and are adjustably connected at their upper ends as at 22 to the reel arms 18 to support the latter in vertically adjusted position.

In accordance with the present invention there are provided one, two or more pick-up units 24, according to the size of the combine to which the invention is attached. Two such units are here illustrated but it is to be understood that the invention is not confined to the use of this number.

The units 24 are operated off of the driven reel shaft 26, from which the reel has been removed and is journalled at its ends in bearings 28 carried by the arms 18, as illustrated. One end of this shaft carries a pulley 30 with which is connected the drive belt 31 operated from a suitable part of the combine structure, not shown, in the conventional manner.

Disposed beneath and lengthwise of the cutter bar of the mower 16 is an angle bar support which is generally designated 32 and which is positioned with one flange or angle 33, directed downwardly as is clearly shown in Figures 1 and 3. This downwardly directed flange 33 of the angle bar support has secured thereto a pair of forwardly directed hinge ears 34, for each of the units 24, which ears are suitably spaced in the direction of the length of the angle bar 32 as shown in Figure 5. These hinge ears 34 are attached to the flange 33 by means of bolts or the like 34′.

Each pick-up unit comprises two forwardly extending frame arms 36 each of which is pivotally attached as at 37 to a hinge ear 34 to extend a substantial distance forwardly beyond the mower mechanism 16.

Secured as at 38 to the rear end portion of each frame arm 36 is an upright post or standard 39 which is curved slightly forwardly at its upper end as illustrated. These posts are preferably formed of angle iron material whereby each provides a laterally extending flange 39a and a forwardly extending flange 39b.

Extending across and connecting the forwardly curving upper ends of the pair of posts or standards 39 of the unit is an angle iron rail 40 having one flange extending upwardly as indicated at 40a and the other flange disposed to extend rearwardly as indicated at 40b.

In the present showing the rail 40 has been provided to have sufficient length to extend across and connect the posts 39 of both of the units shown.

The upstanding flange 40a of the rail 40 is provided with the longitudinally extending series of adjustment apertures 41 and this flange lies against the lateral flanges 39a of the adjacent posts as shown so that securing bolts 42 may be passed through suitable apertures in the upper ends of the standards or posts 39 into selected ones of the apertures 41 to vary, as desired, the spacing between the pairs of posts.

Between the pair of posts 39 there are positioned two bearing units each of which is generally designated 43. Each unit is of rectangular U-shaped form and the comprises a bracket or bottom plate 44 from each side of which rises an arm 45 which carries on its top end the bearing 46. *Other types or forms of bearing supports may, of course, be utilized.*

At the center of the plate between the arms 45 is a vertical bearing 47 for the purpose hereinafter described.

The two bearing units 43 are disposed with the arms 45 against the upstanding flange portion 40a of the rail 40 and a portion of the plate 44 extends across and is positioned against the underside of the flange of 40b. This portion of flange 40b is provided with a plurality of adjustment apertures 40c to receive the securing bolts 48 which are extended through suitable apertures in the plates 44 whereby the plates, and consequently the bearing units, can be adjusted lengthwise of the rail 40.

The shaft 26 extends through the aligned bearings 46 of the units 43 as shown in Figure 4 and thus is supported from the rail 40 in addition to being supported at its ends by the reel arms 18.

The shaft 26 is provided with a key slot 49 and between each pair of arms 45 the shaft 26 carries a miter gear 50 which is slidably connected with the shaft 26 by a key 49a engaged for movement longitudinally in the slot 49. Thus it will be seen that the shaft will effect rotation of the gears 50 and the gears may be shifted lengthwise on the shaft as necessary.

Figure 2:
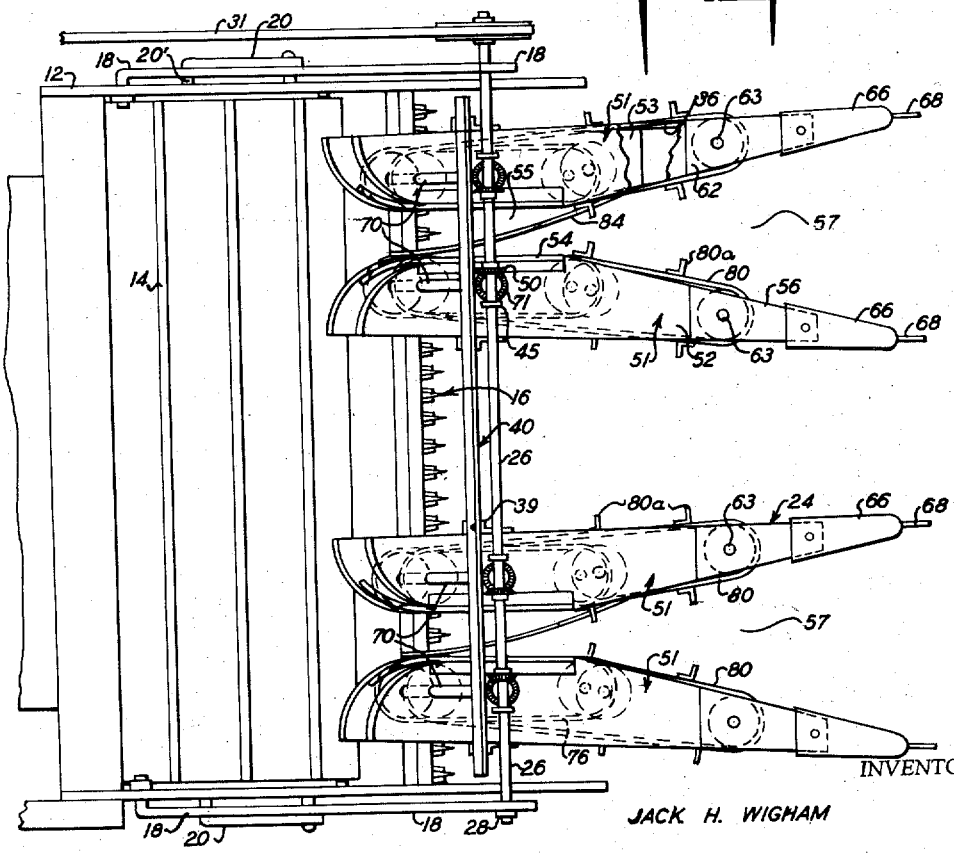
Figure 2 is a view in top plan of the structure shown in Figure 1, a portion of the top plate of one of the pick-up units being broken away to show the termination of the shortened forward end of the bottom plate.

Each of the pick-up units 24 comprises two spaced elongate feeder parts each of which is generally designated 51 and which are in spaced relation as shown in Figure 2. Each of the feeder parts 51 comprises the vertically spaced top and bottom plates 52 and 53 respectively, the rear edge portions of which are in substantially parallel relation as indicated at 54, forming a throat 55 into which the picked up material is received, while the adjacent or opposing edges of the top and bottom plates forwardly of the straight parallel edges or portions 54, are tapered as indicated at 56 so as to have a forwardly divergent relation providing the feeder or feed entrance 57 leading to the throat 55.

As shown in Figures 1 and 3 the top and bottom plates 52 and 53 are in vertically spaced parallel relation and they are disposed at a forward and downward inclination between the pair of posts 39 to which they are secured by screws or bolts 58.

The under or bottom plate 53 of each pair is also considerably shorter than the top plate 52 as shown in the two figures mentioned and the forward end of each bottom plate 53 is secured at the outer side thereof to the inner side of the adjacent frame arm 36 as indicated at 59.

Each of the frame arms 36 as its forward end is joined to the outer edge of the overlying end of the adjacent top plate 52 by the vertical shoe plate 60 which has the forwardly and upwardly curving advancing edge 61.

The top edge of this shoe plate 60 is joined to the inwardly extending top plate 62 which extends rearwardly over the top of the adjacent plate 52 and is secured in position by the pivot bolt 63 which passes downwardly through the adjacent plate 52 and is connected at its lower end to an arm 64 carried by and extending rearwardly from the shoe plate 60. On this pivot bolt 63 is rotatably mounted a pulley 65 the periphery of which on the feeder or entrance side thereof is approximately in the vertical plane of the adjacent edge 56 of the overlying plate 52.

Positioned over and straddling the forward end of each shoe 60 and the forward end of the plate 62 connected therewith is the forwardly tapering channeled pick-up arm 66 which is positioned with the channel downwardly extending so that the side portions 66a may have extended transversely therethrough and through the shoe 60, the pivot pin 67.

The pick up arm 66 extends a substantial distance beyond the forward end or point of the shoe plate 60 as shown in Figures 1 and 3 and carries at its forward end the slender forwardly and upwardly curving finger 68.

Threaded through the plate 62 from the underside is an adjustment screw 69 which engages the underside of the arm 66 so that the arm may have its forward end raised or lowered thereby providing for vertical adjustment of the pick up portion of the feed unit member in addition to the raising and lowering facility provided by the pivoted reel arms 18 which when raised or lowered elevate or depress the entire attachment, turning the same on the pivots 37.

Each of the vertical bearings 47 has extended therethrough the upper end of a vertical shaft 70 which extends downwardly through the rear ends of the underlying pair of plates 52 and 53. The upper end of the shaft 70 carries the miter gear 71 which meshes with the adjacent gear 50 and at the lower end between the plates 52 and 53 the shaft has secured thereto the upper and lower belt pulleys 72 and 73 respectively. *While a bevel gear drive means has been shown and described, it is to be understood that other suitable power transmitting means may be employed.* The peripheries of these pulleys are adjacent to the inner edges 54 of the top and bottom plates of the two feeder parts as shown most clearly in Figure 2.

At the forward end of each of the bottom plates 53 there is fixed the projecting pivot bolt 74 on which is mounted, above the plate, the pulley 75. This pulley is at the forward end of the throat 55 while the corresponding pulley 73 is at the rear end of the throat and trained around these pulleys is the endless belt 76 which carries the outwardly projecting fingers 77 which project into the throat on the inner run of the belt.

Each of the top plates 52 carries at the forward end of the throat 55 the fixed pivot pin or bolt 78 on which is supported, upon the underside of the plate 52, the idler pulley 79.

Trained around the pulleys 65 and 72 adjacent to each of the top plates 52 is the endless belt 80 which carries the outwardly projecting fingers 80a and one run of this belt passes over the throat side of the adjacent idler pulley 79. This idler pulley is so positioned that the fingers 80a will extend into the feed space 57 and will also project into the throat 54 as the fingers move rearwardly.

Connected between each pair of top and bottom plates 52 and 53 at the inner edges thereof, particularly in the throat area 55, is a sheet metal guard plate or wall 81 which functions to prevent the picked up plants from escaping from the belt fingers 77 and 80a as the latter carry the plants through the throat toward the conveyor 14.

Upon the top of each of the top plates 52 there is secured along the throat edge 54 the upstanding guard wing 82. These wings are of gradually increasing height from the forward ends, which are positioned adjacent to the forward portion of the throat, and the rear ends curve laterally as shown in Figures 2 and 4 so that the plates open out or diverge at the back ends of the feeder parts.

In addition to the guard plates or walls 81 the inner edges of the lower plates 53 are secured thereto along the extent of the throat 55, the depending sheet metal walls or guards 83. As previously pointed out the guard plates or walls 81 are to prevent the plants from falling or falling laterally as they pass through the throat and the wings 82 and lower guard walls 83 also cooperate with the walls or plate 81 to ensure the maintenance of the lifted plants in proper elevated position to be cut by the cutter mechanism.

From the foregoing it is believed that it will be readily apparent that the forward ends of the parts 51 of the pick-up units may be readily raised or lowered by the conventional means provided for elevating the reel which the present attachment replaces, the units when being raised or lowered pivoting on the pivot bolts connected with the angle bar which is secured along the underside of the cutter mechanism.

Also the forward ends of the pick-up arms 66 may be lowered to bring the fingers 68 into close contact with the ground so that plants lying down on the ground can be easily raised and since the machine is designed so as to have the pick-up units pass along the plant rows, the fallen plants will enter the feeder entrances 57 and be gradually moved toward the center of the throat 55 and during this movement the fingers of the endless belts on the two sides of the throat will engage the plant and assist in raising it to upright position so that it can be easily cut by the cutter mechanism.

In order to facilitate the handling of single plants and to maintain them in upright position where the width of the throat 55 might be such as would allow the plant to lean over to one side, one of the feeder parts 51 has secured to the tapered edge portion 56 of the top plate 52, an end of an elongate resilient arm 84 which extends rearwardly and obliquely across the width of the throat 55 as shown in Figure 2, the rear end of the arm being in close proximity to or engaging the rear portion of the edge 54 of the opposite plate 52. Thus the plants when brought into the throat will be gradually squeezed between the resilient arm 84 and the opposing edge of the top plate 52 and thus be firmly held in upright position when the cutter blades of the cutting mechanism come into contact with the stalk thereof. It will be seen upon reference to Figure 2 that the point of engagement of the arm 84 with the inner edge of the top plate 52 is directly above the cutter glades so that the plant stalk will thus be firmly held in raised position when the blades engages it.

I claim:

*1.* In a plant pickup attachment for combines, including a cutter bar *mounted at the forward end thereof* [and a conveyor behind the cutter bar of the combine]; *said attachment comprising* an angle bar carried by said cutter bar and having a depending flange, a pair of elongate arms spacedly pivoted to said flange for vertical swinging movements and extending forwardly therefrom, a pair of forwardly directed and tapered pickup units, one of said units being supported on each of said arms, a ground engaging shoe *secured to* [at] the forward end of each of said units, a pickup element projecting forwardly from each of said shoes and having vertical pivot connections therewith, means *on each unit engaging the associated pick-up element* for adjusting the height of each of the pickup elements relative to the ground, an endless belt carried by each of said units and having laterally directed fingers projecting *therefrom* [from the outer side thereof], said units being divergent in the forward direction so as to provide a relatively narrow throat between the rear end portions of the same, a standard rising from each of said arms, a rail extending between and connecting [the upper end portions of] said standards, U-shaped brackets rising from said rail, a bearing carried *by* [at the free end of] each of the arms of said brackets, a shaft journalled in said bearings, power transmitting means *connecting* [between] said shaft and each of said belts, and other means *connected to said shaft* for applying power *thereto* [to said shaft].

*2. In a plant pickup attachment for combines, including a cutter bar mounted at the forward end thereof; said attachment comprising an angle bar carried by said cutter bar and having a depending flange, a pair of elongate arms spacedly pivoted to said flange for vertical swinging movements and extending forwardly therefrom, a pair of forwardly directed and tapered pickup units, one of said units being supported on each of said arms, a ground engaging shoe secured to the forward end of each of said units, a pickup element projecting forwardly from each of said shoes and having vertical pivot connections therewith, means on each unit engaging the associated pickup element for adjusting the height of each of the pickup elements relative to the ground, an endless belt carried by each of said units and having laterally directed fingers projecting therefrom, said units being divergent in the forward direction so as to provide a relatively narrow throat between the rear end portions of the same, a standard rising from each of said arms, a rail extending between and connecting said standards, bearings carried by said rail, shafts journalled in said bearings, power transmitting means connecting said shafts and said belts and means connected to said shafts for transmitting power thereto.*

References Cited in the file of this patent or the original patent

UNITED STATES PATENTS

| | | |
|---|---|---|
| 1,247,070 | Benjamin | Nov. 20, 1917 |
| 1,514,304 | Riehle | Nov. 4, 1924 |
| 1,942,037 | Pierson | Jan. 2, 1934 |
| 2,139,962 | Knudson | Dec. 13, 1938 |
| 2,279,183 | Stimatze | Apr. 7, 1942 |
| 2,313,670 | Roberts et al. | Mar. 9, 1943 |